US008687256B2

(12) United States Patent  (10) Patent No.: US 8,687,256 B2
Torii  (45) Date of Patent:  Apr. 1, 2014

(54) LENS BARRIER DEVICE AND LENS BARREL EQUIPPED WITH THE SAME

(75) Inventor: Shinnosuke Torii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/966,546

(22) Filed: Dec. 13, 2010

(65) Prior Publication Data

US 2011/0157700 A1  Jun. 30, 2011

(30) Foreign Application Priority Data

Dec. 25, 2009 (JP) ................... 2009-295438

(51) Int. Cl.
*G02B 26/02* (2006.01)
(52) U.S. Cl.
USPC ............................ 359/227; 359/511; 396/510
(58) Field of Classification Search
USPC ......... 359/230, 234, 236, 507–508, 511, 819, 359/822, 823; 396/448, 510, 485, 488
See application file for complete search history.

(56) References Cited

U.S. PATENT DOCUMENTS 5,739,962 A * 4/1998 Asakura et al. ............... 359/700

FOREIGN PATENT DOCUMENTS

JP  2010-156732 A  7/2010

* cited by examiner

*Primary Examiner* — James Phan
(74) *Attorney, Agent, or Firm* — Carter, DeLuca, Farrell & Schmidt, LLP

(57) ABSTRACT

A lens barrier device includes a first barrier blade including a shielding portion, a connection portion, and an abutment portion. The abutment portion is connected, on an optical axis imaging surface side of the shielding portion, to the shielding portion via the connecting portion. Further, a second barrier blade is provided on an optical axis imaging surface side with respect to the shielding portion. A regulating portion is provided whose optical axis imaging surface side is configured to contact the abutment portion, wherein an outer peripheral portion of the second barrier blade, the connecting portion, and the abutment portion are located in this order from an optical axis center to an optical axis outer side.

4 Claims, 13 Drawing Sheets

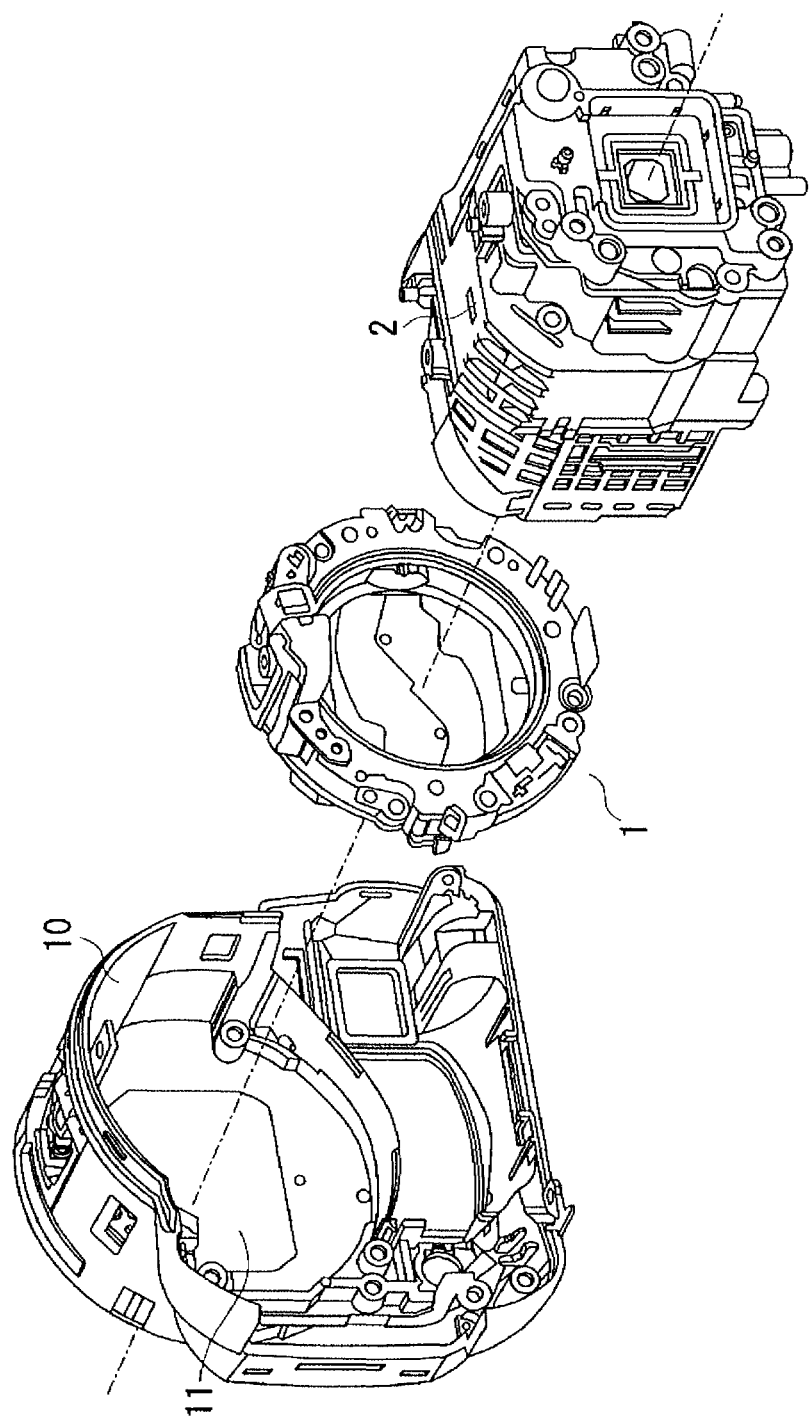

LENS BARRIER DEVICE AND LENS BARREL EQUIPPED WITH THE SAME

BACKGROUND OF THE INVENTION

1. Field of the Invention

The present invention relates to a lens barrier device of an imaging apparatus such as a camcorder or a digital camera.

2. Description of the Related Art

A conventional lens barrier device has the following construction (See, for example, Japanese Patent Application No. 2008-333524 (Japanese Patent Application Laid-Open No. 2010-156732)).

In the following, this construction will be described with reference to FIG. 12. In the conventional example, to protect an imaging lens, four barrier blades in total, i.e., outer barrier blades 120a and 120b and inner barrier blades 130a and 130b, rotate around rotation shafts 112a and 112b provided on an external cover 110 and parallel to the optical axis of the imaging lens. As illustrated in FIG. 13, when the lens barrier device is in the open state, the outer barrier blade 120a and the inner barrier blade 130a, and the outer barrier blade 120b and the inner barrier blade 130b, respectively overlap each other in the optical axis direction. Due to this construction, the projected area as seen from the optical axis forward end side in the open state is reduced, thereby realizing a reduction in the imaging lens diameter of the imaging apparatus.

However, in the above conventional technique, the external cover 110 is assembled to the imaging apparatus main body in combination with another external cover and the like. Thus, there is generated in the external cover 110 deformation or the like due to the assembling. As a result, the rotation shafts 112a and 112b undergo deformation, the requisite drive force for the opening/closing operation increases, and a suitable opening/closing operation is hindered. On the other hand, an attempt to realize in the external cover 110 a configuration helping to prevent the deformation due to the assembling to the imaging apparatus main body results in a limitation to the configuration of the external cover situated in front of the imaging apparatus main body. This is not desirable since it leads to a restriction in terms of salability factor such as design.

In view of this, there is formed a lens barrier unit by additionally providing, between the external cover 110 and the outer barrier blades 120a and 120b of the conventional example, another member on which the rotation shafts 112a and 112b are formed. This construction is also generally adopted in a lens barrier device in which the lens barrier unit is fixed to an external cover. This enables suppressing deformation due to the assembling of the external cover. However, due to an increase in the number of components, there is involved an increase in the production cost of the imaging apparatus main body and in the size thereof in the optical axis direction due to the added components.

SUMMARY OF THE INVENTION

According to an aspect of the present invention, a lens barrier device includes a first barrier blade including a shielding portion, a connection portion, and an abutment portion, the abutment portion being connected, on an optical axis imaging surface side of the shielding portion, to the shielding portion via the connecting portion, a second barrier blade provided on an optical axis imaging surface side with respect to the shielding portion, and a regulating portion whose optical axis imaging surface side is configured to contact the abutment portion, wherein an outer peripheral portion of the second barrier blade, the connecting portion, and the abutment portion are located in this order from an optical axis center to an optical axis outer side.

According to an exemplary embodiment of the present invention, the size of a lens barrier device can be reduced in the optical axis direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is an exploded perspective view of the lens barrel illustrated in FIGS. 1A and 1B.

DESCRIPTION OF THE EMBODIMENTS

Various exemplary embodiments, features, and aspects of the invention will be described in detail below with reference to the drawings.

Figure 1A:
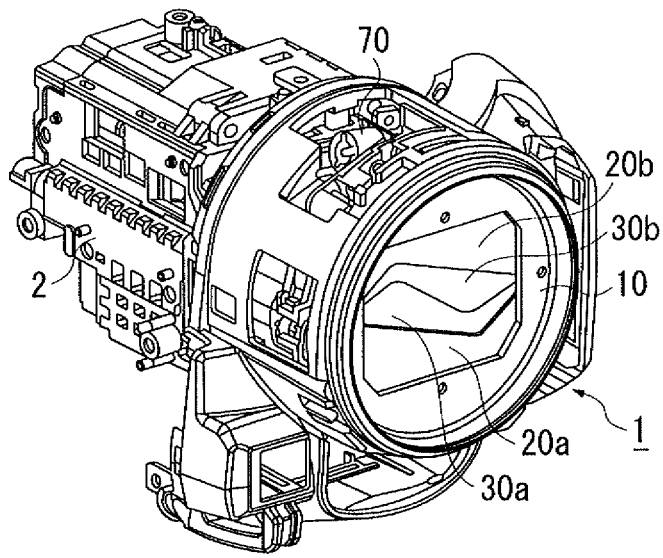
FIGS. 1A and 1B are external perspective views of a lens barrel according to an exemplary embodiment of the present invention.
Figure 1B:
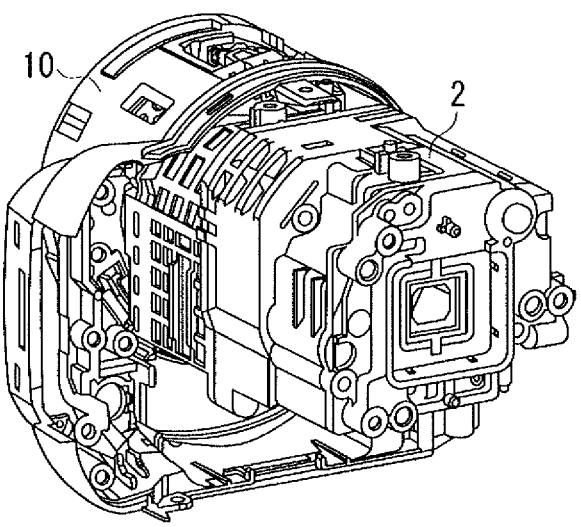

FIGS. 1A and 1B are external perspective views of a lens barrel in an imaging apparatus according to an exemplary embodiment of the present invention. The lens barrel includes a lens barrier device 1, an imaging lens 2, and an external cover 10. As illustrated in FIGS. 1A and 1B, the lens barrier device 1 is arranged at the optical axis forward end side (object side) of the imaging lens 2.

Figure 3:
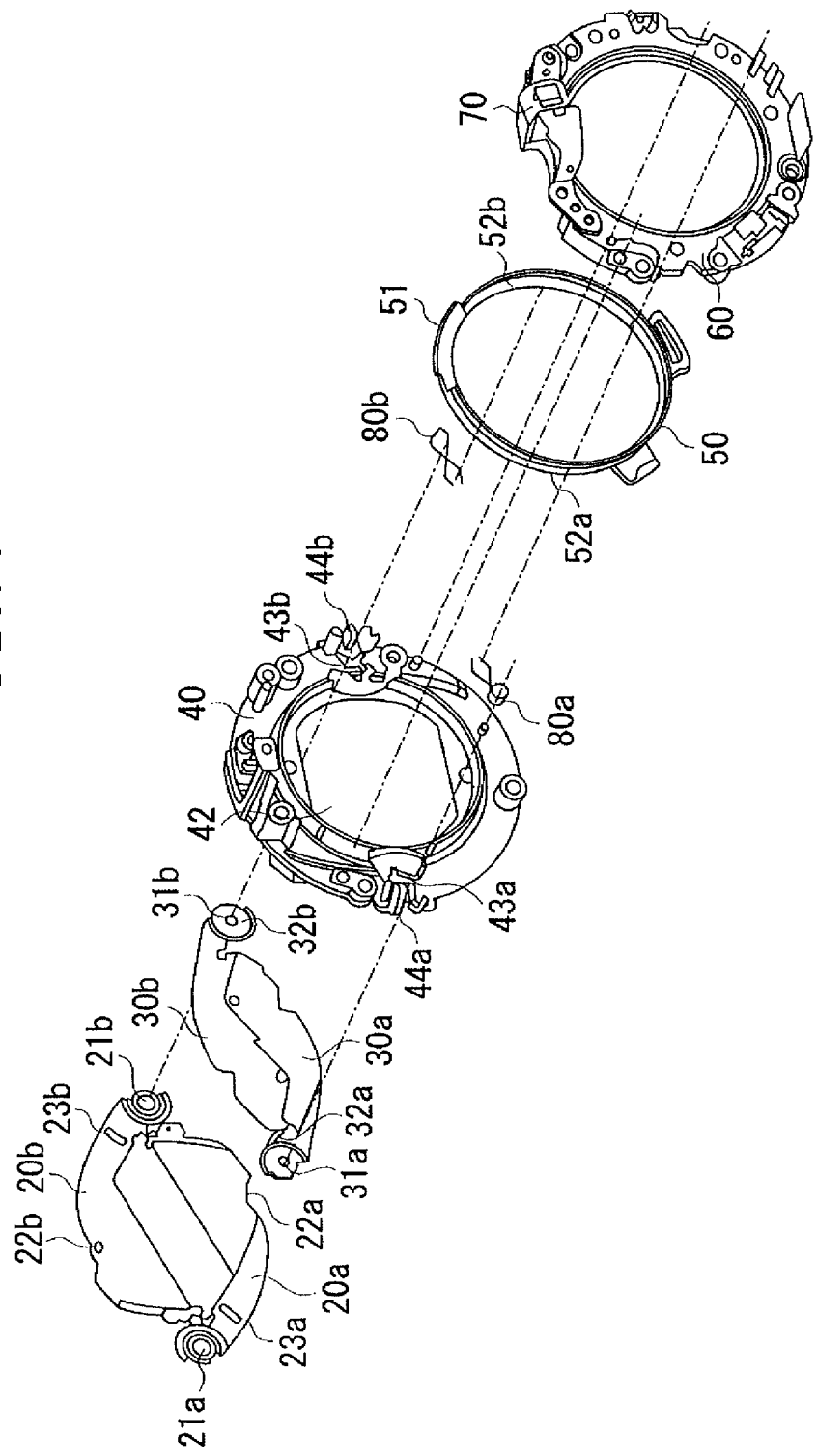
FIG. 3 is an exploded perspective view of the lens barrel illustrated in FIGS. 1A and 1B.
Figure 4:
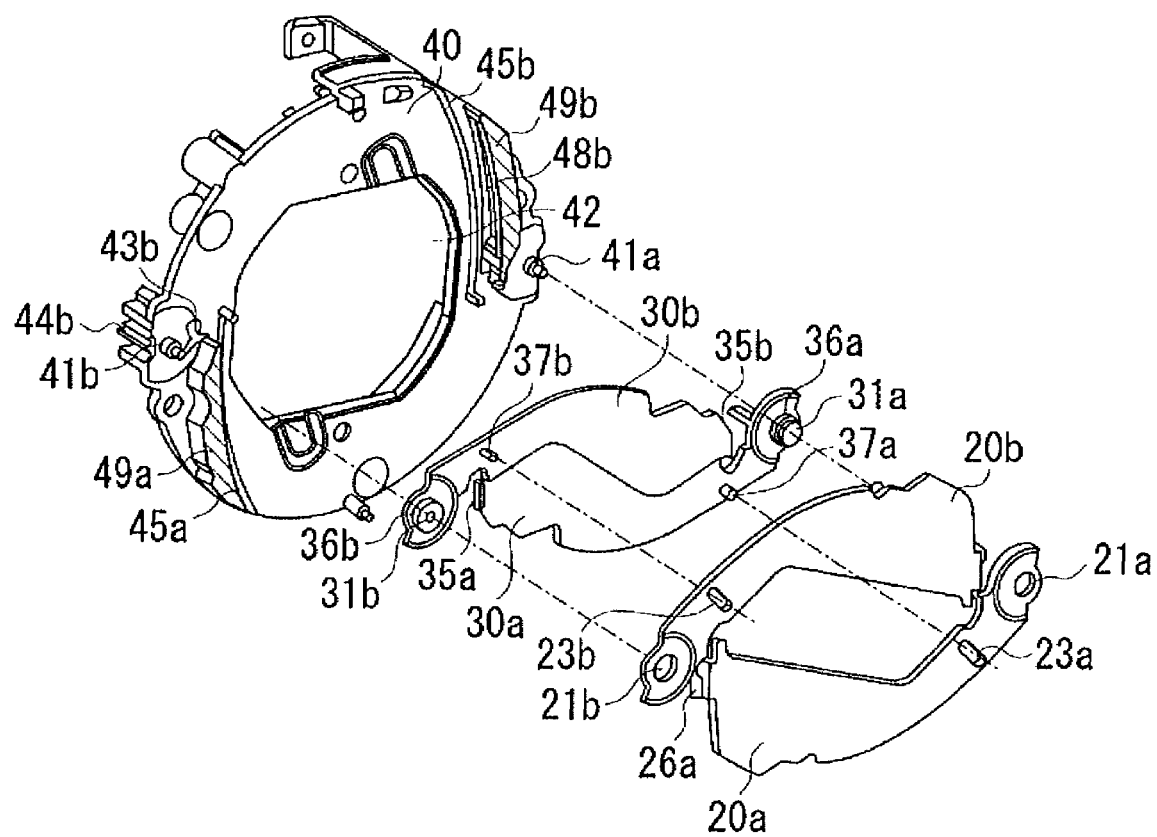
FIG. 4 is an exploded perspective view of the lens barrel illustrated in FIGS. 1A and 1B.
Figure 5A:
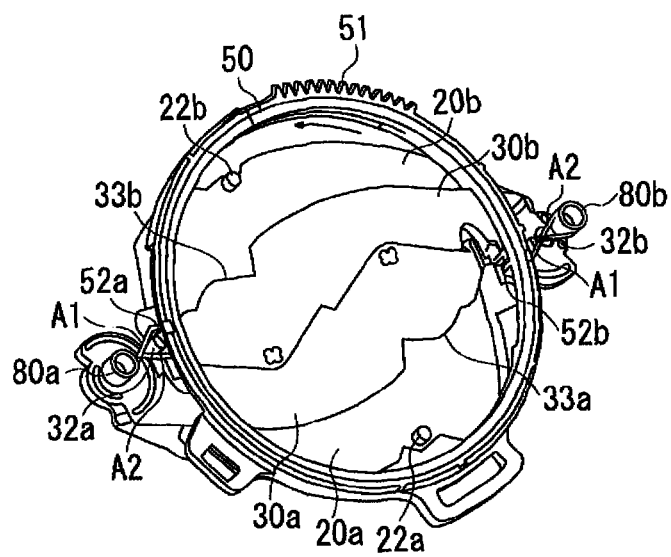
FIGS. 5A and 5B are assembly diagrams illustrating barrier blades.
Figure 5B:
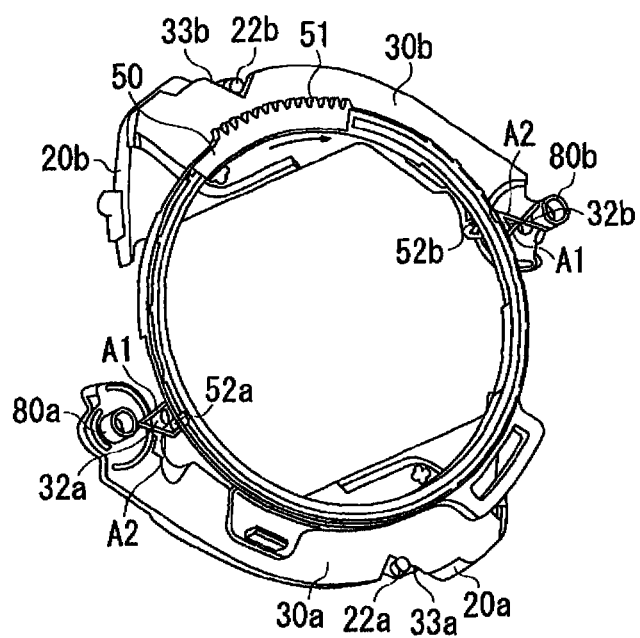
Figure 6:
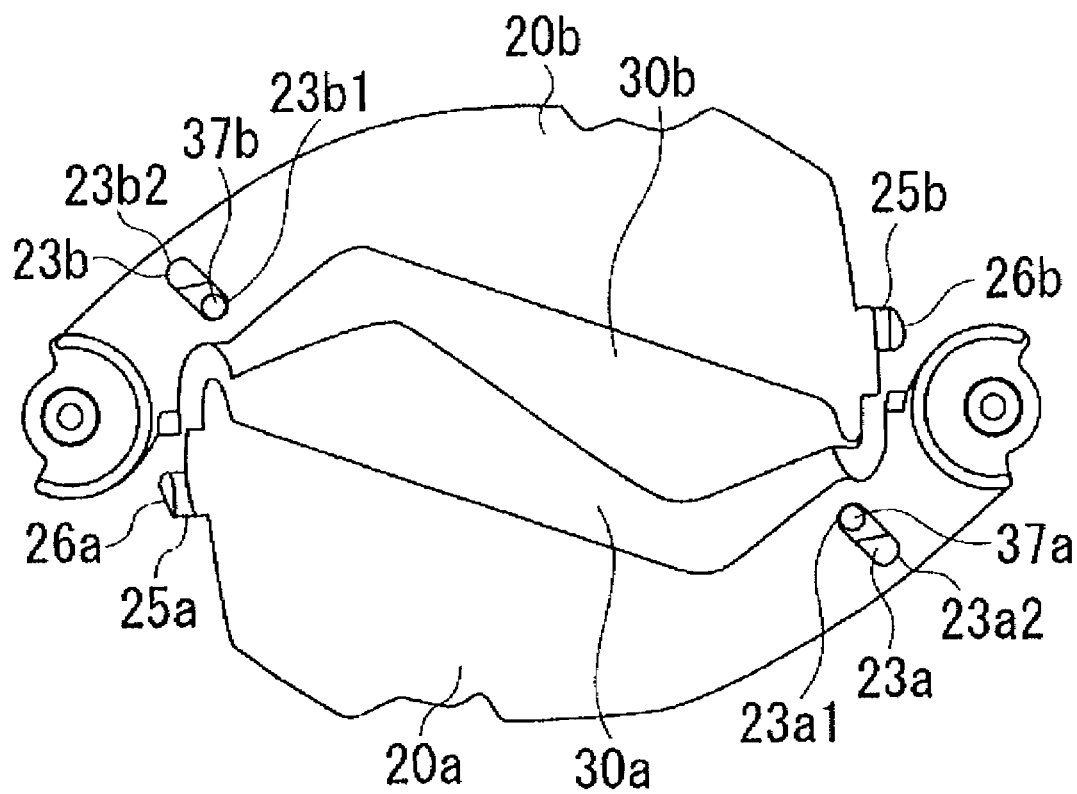
FIG. 6 is a diagram illustrating the structure of the barrier blades.

FIG. 2 is an exploded perspective view of the lens barrel illustrated in FIGS. 1A and 1B, and FIG. 3 is an exploded perspective view of a main portion of the lens barrier device 1. FIG. 4 is an exploded perspective view, as seen from the optical axis forward end side, of part of the components illustrated in FIG. 3. FIGS. 5A and 5B and FIG. 6 are perspective views of barrier blades, with a barrier base 40 illustrated in FIGS. 3 and 4 being omitted.

As illustrated in FIGS. 2 through 5A and 5B, the lens barrier device 1 includes two outer barrier blades 20a and 20b, two inner barrier blades 30a and 30b, the barrier base 40, a drive cam ring (drive member) 50, a barrier unit base 60, and a motor 70. The two outer barrier blades 20a and 20b and the two inner barrier blades 30a and 30b are located on the optical axis forward end side with respect to the imaging lens 2, and rotate so as to allow opening and closing. The two outer barrier blades 20a and 20b and the two inner barrier blades 30a and 30b respectively function as a first barrier blade and a second barrier blade. An opening 11 is formed in the external cover 10. Blade shafts 41a and 41b are formed on the external cover 10 side (the left-hand side in FIGS. 2 and 3, and the right-hand side in FIG. 4) of the barrier base 40. The blade shafts 41a and 41b are provided in a line orthogonal to the lens optical axis direction in point symmetry with respect to the optical axis.

The outer barrier blades 20a and 20b respectively have shaft holes 21a and 21b, regulating pins 22a and 22b, and elongated holes 23a and 23b. The inner barrier blades 30a and 30b respectively have shaft holes 31a and 31b, spring engagement portions 32a and 32b, and cutout portions 33a and 33b.

The outer barrier blade 20a and the outer barrier blade 20b are configured to shield the outer peripheral portion of the lens optical axis, that is, the outer peripheral portion of the opening 11 of the external cover 10 and that of an opening 42 of the barrier base 40. The outer barrier blade 20a and the outer barrier blade 20b have a similar shape. The inner barrier blade 30a and the inner barrier blade 30b are configured to shield the central portion of the opening 11 of the external cover 10 and that of the opening 42 of the barrier base 40. The inner barrier blade 30a and the inner barrier blade 30b have a similar shape. Thus, the four barrier blades 20a, 20b, 30a, and 30b are configured to shield the entire opening region of the opening 11 of the external cover 10 and that of the opening 42 of the barrier base 40.

The inner barrier blade 30a is swingably pivoted on the blade shaft 41a of the barrier base 40 via the shaft hole 31a. The shaft hole 21a of the outer peripheral blade 20a is fit-engaged with a fit-engagement shaft 36a concentrically provided on the outer peripheral side of the shaft hole 31a of the inner barrier blade 30a. Accordingly, the outer peripheral blade 20a is swingably pivoted. As a result, both the inner barrier blade 30a and the outer barrier blade 20a are pivoted so as to be rotatable around the blade shaft 41a of the barrier base 40. Similarly, both the outer barrier blade 20b and the inner barrier blade 30b are pivoted so as to be rotatable around the blade shaft 41b of the barrier base 40.

Figure 7:
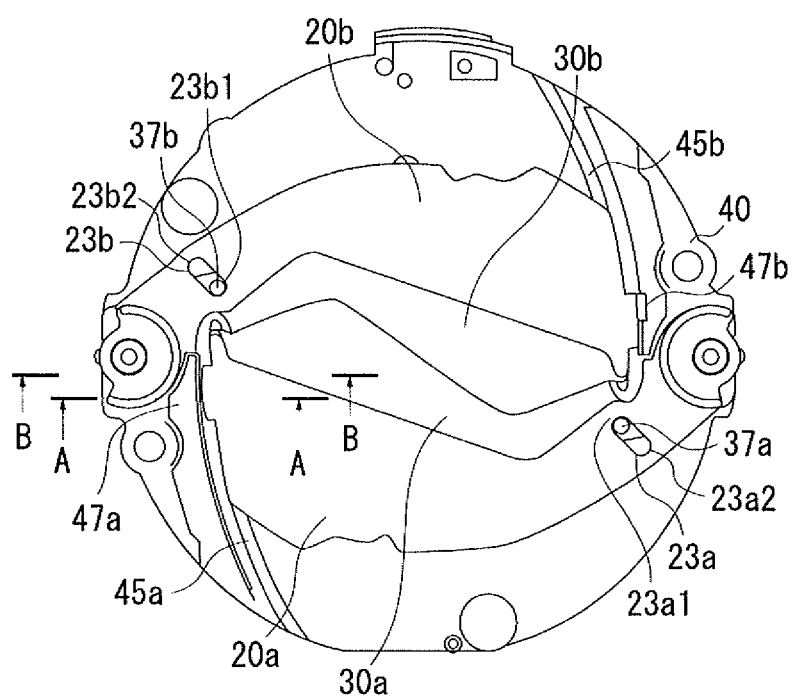
FIG. 7 is a diagram illustrating the structure of the barrier blades.
Figure 8:
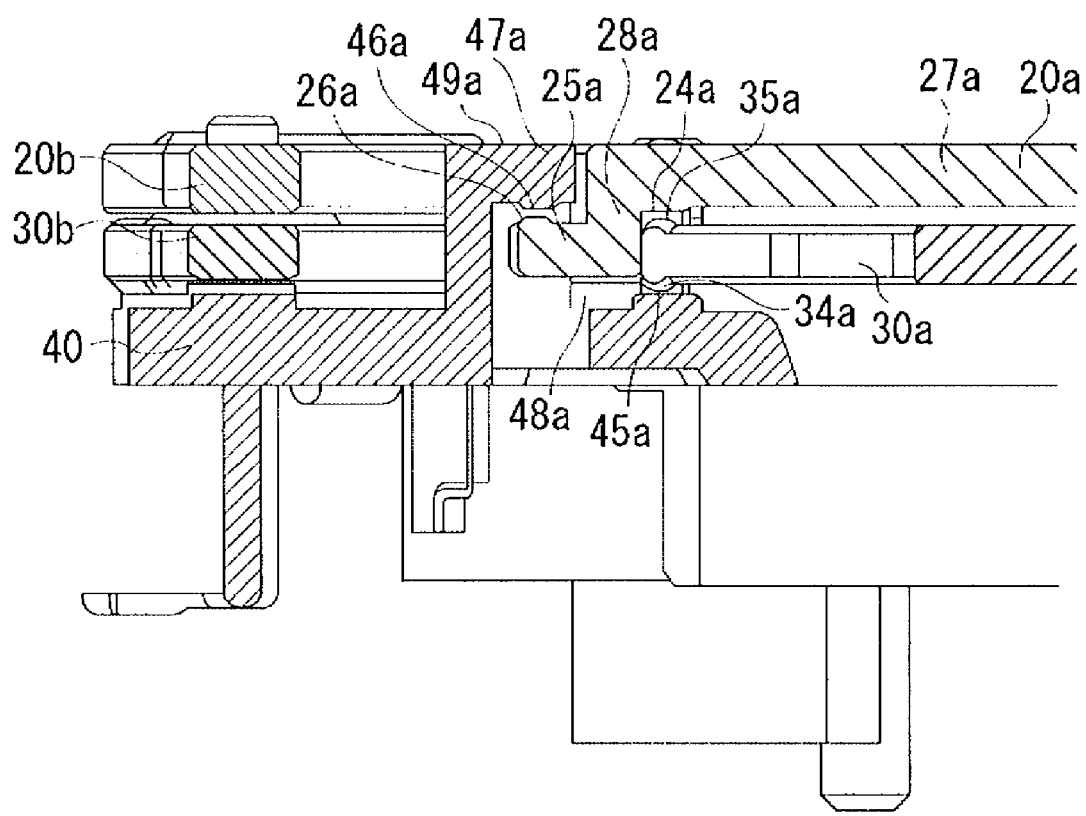
FIG. 8 is an explanatory sectional view of the barrier blades.
Figure 9:
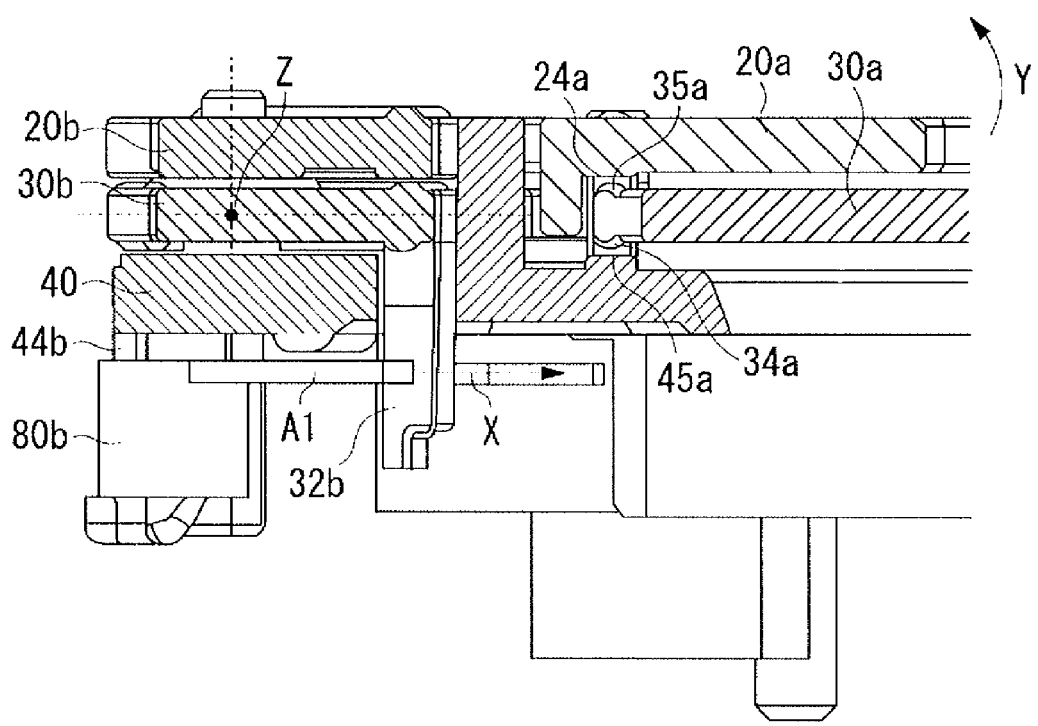
FIG. 9 is an explanatory sectional view of the barrier blades.

In the following, the unit structure of the lens barrier device according to the present exemplary embodiment of the present invention will be described in detail. FIGS. 6 and 7 are diagrams showing the four barrier blades as seen from the external cover 10 side. FIG. 6 illustrates only the inner barrier blades 30a and 30b and the outer barrier blades 20a and 20b to illustrate an interlock opening/closing principle of the barrier blades described below. On the other hand, FIG. 7 illustrates the barrier base 40 in addition to what is illustrated in FIG. 6. FIG. 8 is a sectional view taken along line A-A in FIG. 7. FIG. 9 is a sectional view, taken along line B-B in FIG. 7, illustrating the influence of the urging due to torsion springs 80a and 80b described below. For the sake of illustration, the configuration of the torsion springs 80a and 80b is also schematically illustrated. To simplify the illustration, FIGS. 8 and 9 illustrate only one side of the barrier blade structure, which is of a symmetrical configuration.

In FIG. 8, the rotation of the inner barrier blade 30a is guided by a first guide portion 45a of the barrier base 40 via a second guide portion 34a in the outer peripheral portion of the inner barrier blade 30a. The rotation of the inner barrier blade 30a is guided by a fourth guide portion 24a of the outer barrier blade 20a via a third guide portion 35a in the outer peripheral portion of the inner barrier blade 30a. In the present exemplary embodiment, the second guide portion 34a and the third guide portion 35a are provided at positions opposite each other.

As illustrated in FIGS. 4 and 8, assuming that a portion shielding the opening 11 in the closed state is a shielding portion 27a, the outer barrier blade 20a has an outer peripheral protrusion 25a on the outer peripheral side of the shielding portion 27a. The outer peripheral protrusion 25a is located at a position where it overlaps the inner barrier blade 30a in the optical axis direction, which, in this case, is substantially the same position, so as to protrude on the outer peripheral side of the inner barrier blade 30a. A connecting portion 28a is a portion connecting the outer peripheral protrusion 27a and the shielding portion 27a, whose positions in the optical axis direction are different, and is on the outer peripheral side of the shielding portion 27a. An abutment portion 26a is provided at the optical axis forward end side of the outer peripheral protrusion 25a. In the present exemplary embodiment, the abutment portion 26a is substantially of the same height in the optical axis direction as the third guide portion 35a of the inner barrier blade 30a.

On the other hand, the barrier base 40 is provided with a protrusion 47a on the outer peripheral side of the first guide portion 45a. The protrusion 47a protrudes from the barrier base 40 so as to be situated on the optical axis forward end side with respect to the barrier base 40, which is on the optical axis rear end side of the inner barrier blade 30a. As described above, the protrusion 47a protrudes from the barrier base portion 40 toward the optical axis forward end side to extend over the inner peripheral side end surface, so that an inner peripheral side space 48a is formed. The outer peripheral protrusion 25a of the outer barrier blade 20a is inserted into the inner peripheral side space 48a. Further, a regulating portion 46a is formed at the position of the protrusion 47a opposite to the abutment portion 26a of the outer barrier blade 20a. The regulating portion 46a is arranged on the outer peripheral side with respect to the guide portion 45a in a plane perpendicular to the optical axis of the imaging lens. The optical axis imaging surface side of the regulating portion 46a contacts the abutment portion 26a, and is situated so as to overlap the optical axis forward end side surface of the inner barrier blade 30a in the optical axis direction. In this way, the outer barrier blade 20a as the first barrier blade is provided with the abutment portion 26a connected, on the optical axis imaging surface side, to the shielding portion 27a via the connecting portion 28a. Further, the inner barrier blade 30a as the second barrier blade is provided on the optical axis imaging surface side with respect to the shielding portion 27a.

Further, the regulating portion 46a is arranged substantially at the same position in the optical axis direction as the optical axis forward end side surface of the inner barrier blade 30a.

Thus, the outer barrier blade 20a and the inner barrier blade 30a are held between the first guide portion 45a, which guides the rotation of the inner barrier blade 30a, and the regulating portion 46a.

The outer peripheral portion of the inner barrier blade 30a, the connecting portion 28a, and the abutment portion 26a are located in this order from the optical axis center to the optical axis outer side. Accordingly, the thickness in the optical axis direction can be reduced as compared with a conventional configuration.

While FIGS. 8 and 9 illustrate only one side of a symmetrical structure, the other side is of a similar construction as described above.

A method of assembling the lens barrier device 1 will be described below. First, the blade shaft 41a of the barrier base 40 is inserted into the shaft hole 31a of the inner barrier blade 30a. Next, the outer peripheral protrusion 25a of the outer barrier blade 20a is inserted into the inner peripheral side space 48a of the barrier base 40. After then, the fit-engagement shaft 36a of the inner barrier blade 30a is inserted into the shaft hole 21a of the outer barrier blade 20a, whereby the device can be assembled in a suitable manner. While only one side of the symmetrical structure has been described, the above description also applies to the other side.

Due to this construction, displacement of the outer barrier blades 20a and 20b toward the optical axis forward end side is regulated by the regulating portion 46a of the barrier base 40. The outer barrier blade 20a and the inner barrier blade 30a are held between the guide portion 45a, which guides the rotation of the inner barrier blade 30a, and the regulating portion 46a. Thus, the device can be formed as a unit, so that the outer barrier blades 20a and 20b are not easily detached from the barrier base 40, thus realizing a lens barrier device in the form of a unit without using the external cover 10 or additional components. As a result, it is possible to provide a lens barrier device helping to mitigate the influence of the deformation due to the assembling of the external cover 10.

In the present exemplary embodiment, the regulating portion 46a and the abutment portion 26a also serve as a guide of the rotation of the barrier base 40 and the outer barrier blade 20a. This also applies to the outer barrier blade 20b.

Further, due to the construction in which the outer peripheral protrusion 25a of the outer barrier blade 20a is connected by the connecting portion 28a, it is possible to form the end surface 49a on the forward end side in the optical axis direction of the protrusion 47a of the barrier base 40 at a position where it overlaps the outer barrier blade 20a in the optical axis direction. Thus, as compared with the case in which the regulating portion 46a of the barrier base 40 is simply arranged on the upper surface of the outer barrier blade 20a, it is possible to achieve a reduction in height in the optical axis direction. This also applies to the outer barrier blade 20b.

For example, in the present exemplary embodiment, the shielding portion 28a, the connecting portion 28a, and the outer peripheral protrusion 25a are formed integrally. In this regard, it is also possible to form all or part thereof as separate components, connecting them together by screws, welding, or the like. In this case, although an increase in the number of components is involved, it is possible to achieve a reduction in height in the optical axis direction as described above.

Further, it is also possible to arrange the abutment portion 26a farther on the rear side (imaging surface side) in the optical axis direction with respect to the third guide portion 35a of the inner barrier blade 30a. This also applies to the inner barrier blade 30b. As a result, it is possible to arrange the end surface 49a of the barrier base 40 farther on the rear side in the optical axis direction, realizing a further reduction in the size of the lens barrier device 1.

Further, it is also possible to arrange the abutment portion 26a between the third guide portion 35a of the inner barrier blade 30a and the forward end side surface in the optical axis direction of the shielding portion 27a of the outer barrier blade 20a. In this case, the end surface 49a of the barrier base 40 is situated on the front end side in the optical axis direction, so that the height in the optical axis direction of the lens barrier device 1 increases as compared with the above-described construction. However, as compared with the case in which the end surface 49a of the barrier base 40 is simply arranged on the forward end side in the optical axis direction of the shielding portion 27a, it is possible to attain the effect of reducing the height in the optical axis direction of the lens barrier device 1.

Further, while in the present exemplary embodiment four barrier blades are used, it is also possible, for example, in the construction illustrated in FIG. 3, to cover the entire opening 11 solely by the two barrier blades, e.g., the inner barrier blade 30a and the outer barrier blade 20a, which are located on the lower side as seen in FIG. 3. Further, it is also possible to form the structure by using three barrier blades in total, e.g., the inner barrier blade 30a and the outer barrier blade 20a, which are similarly on the lower side as seen in FIG. 3, and one enlarged barrier blade on the upper side as seen in FIG. 3.

Next, the drive structure of the barrier blades will be described in detail. As illustrated in FIG. 3, in addition to the opening 42, the barrier base 40 has relatively large rotation holes 43a and 43b respectively allowing the spring engagement portions 32a and 32b of the inner barrier blades 30a and 30b to protrude and rotate. The rotation holes 43a and 43b are of a rectangular shape (or a substantially rectangular shape), with the longer sides thereof extending in the circumferential direction of the barrier base 40. Further, the barrier base 40 has spring shafts 44a and 44b, to which the coil portions of torsion springs (torsion coil springs) 80a and 80b are to be attached and pivoted, respectively. In FIGS. 2 through 5A and 5B, the torsion springs 80a and 80b are schematically illustrated; their configuration is separately illustrated in detail in FIGS. 10A through 10C.

The drive cam ring 50 has a spur tooth portion 51 and spring engagement portions 52a and 52b. The spur tooth portion 51 is in mesh with a gear train (not illustrated), and the drive force of the motor 70 is transmitted to the drive cam ring 50 via the spur tooth portion 51 and the gear train to rotate the drive cam ring 50. The spring engagement portions 52a and 52b of the drive cam ring 50 rotate within the rotation holes 43a and 43b of the barrier base 40.

The winding angle of the torsion springs 80a and 80b is approximately 300 degrees, and arm portions extending from the coil portion of each of them extend in the direction in which the coil portion extends, i.e., so as to cross each other as seen in the lens optical axis direction. In the assembled state, the spring engagement portion 32a of the inner barrier blade 30a and the spring engagement portion 52a of the drive cam ring 50 are situated in the region defined between the two arm portions of the torsion spring 80a (the region on the front side of the above-mentioned crossing position).

Similarly, the spring engagement portion 32b of the inner barrier blade 30b and the spring engagement portion 52b of the drive cam ring 50 are situated in the region defined between the two arm portions of the torsion spring 80b (the region on the front side of the above-mentioned crossing position). The torsion springs 80a and 80b act so as to urge the inner barrier blades 30a and 30b in both opening and closing directions.

Next, the opening/closing drive of the four barrier blades will be described with reference to FIGS. 5A and 5B and FIG. 6. FIG. 5A illustrates a state in which the four barrier blades are closed, and FIG. 5B illustrates a state in which the four barrier blades are open.

As illustrated in FIG. 5A, in the state in which the four barrier blades are closed, arm portions A1 of the torsion springs 80a and 80b are engaged with the spring engagement portions 52a and 52b of the drive cam ring 50, respectively, while imparting an urging force thereto. Further, arm portions A2 of the torsion springs 80a and 80b are engaged with the spring engagement portions 32a and 32b of the inner barrier blades 30a and 30b, respectively, while imparting an urging force thereto.

In this state, when the drive cam ring 50 gradually rotates in the direction of the arrow illustrated in FIG. 5A (counterclockwise), the spring engagement portions 52a and 52b of the drive cam ring 50 strive to move away from the arm portions A1 of the torsion springs 80a and 80b, respectively. As a result, the torsion springs 80a and 80b gradually rotate clockwise (downward as seen in FIG. 5A) around the spring shafts 44a and 44b, respectively.

The torsion springs 80a and 80b rotate clockwise around the spring shafts 44a and 44b, respectively, whereby the arm portions A1 are engaged with the spring engagement portions 32a and 32b of the inner barrier blades 30a and 30b to act on the inner barrier blades 30a and 30b so as to gradually open them, respectively. In this case, after the inner barrier blades 30a and 30b have been opened to some degree, the outer barrier blades 20a and 20b are also opened in synchronization with the opening of the inner barrier blades 30a and 30b. The principle of this operation will be described below with reference to FIG. 6.

And, as illustrated in FIG. 5B, in the state in which the four barrier blades are completely open, the arm portions A1 of the torsion springs 80a and 80b are engaged with the spring engagement portions 32a and 32b of the inner barrier blades 30a and 30b, respectively, while imparting an urging force thereto.

Further, in the state in which the four barrier blades are completely open, the arm portions A2 of the torsion springs 80a and 80b are engaged with the spring engagement portions 52a and 52b of the drive cam ring 50, respectively, while imparting an urging force thereto. Further, in the state in which the four barrier blades are completely open, the cutout portions 33a and 33b of the inner barrier blades 30a and 30b are engaged with the regulating pins 22a and 22b of the outer barrier blades 20a and 20b, respectively.

In the state illustrated in FIG. 5B, when the drive cam ring 50 rotates in the direction of the arrow in FIG. 5B (clockwise), the four barrier blades are placed in the closed state illustrated in FIG. 5A on the same principle as that in the case of opening. In this case also, after the inner barrier blades 30a and 30b have been closed to some degree, the outer barrier blades 20a and 20b are gradually closed in synchronization with the closing of the inner barrier blades 30a and 30b.

Next, the interlock opening/closing principle of the outer barrier blades 20a and 20b will be described with reference to FIG. 6.

As described above, the outer barrier blades 20a and 20b have the elongated holes 23a and 23b, respectively. On the other hand, the inner barrier blades 30a and 30b have drive pins 37a and 37b on the surfaces opposite to the outer barrier blades 20a and 20b, respectively. At the time of assembly, the drive pins 37a and 37b are inserted into the elongated holes 23a and 23b, respectively, and are movable within the range of the elongated holes 23a and 23b, respectively.

As illustrated in FIG. 6, in the state in which the four barrier blades are closed, the drive pins 37a and 37b are situated at closing side end portions 23a1 and 23b1 of the elongated holes 23a and 23b, respectively. When the inner barrier blades 30a and 30b are gradually opened with the four barrier blades closed, the drive pins 37a and 37b move toward opening side end portions 23a2 and 23b2 of the elongated holes 23a and 23b, respectively. Then, the drive pins 37a and 37b bump into the opening side end portions 23a2 and 23b2, respectively.

In this case, until the drive pins 37a and 37b bump into the opening side end portions 23a2 and 23b2 of the elongated holes 23a and 23b, respectively, only the inner barrier blades 30a and 30b are opened, and the outer barrier blades 20a and 20b remain at rest.

Then, in the state in which the drive pins 37a and 37b are in contact with the opening side ends portions 23a2 and 23b2 of the elongated holes 23a and 23b, respectively, when the inner barrier blades 30a and 30b are further opened, the opening force is transmitted to the outer barrier blades 20a and 20b via the drive pins 37a and 37b, respectively. As a result, the outer barrier blades 20a and 20b are opened in synchronization with the opening of the inner barrier blades 30a and 30b.

In the case in which the four barrier blades are closed from the open state, the drive pins 37a and 37b bump, in the course of closing, into the closing side end portions 23a1 and 23b1 of the elongated holes 23a and 23b, respectively. Thus, also in the case of closing, the outer barrier blades 20a and 20b are closed, in the course of the closing operation, in synchronization with the closing of the inner barrier blades 30a and 30b.

Figure 10A:
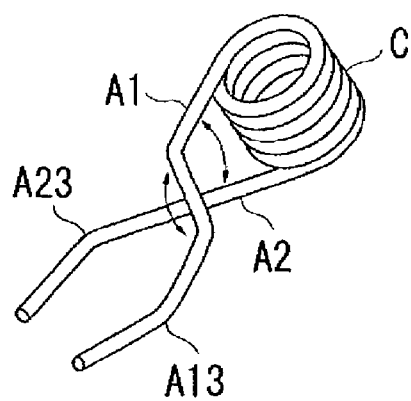
FIG. 10A through 10C are diagrams illustrating the configuration of a torsion spring.
Figure 10B:
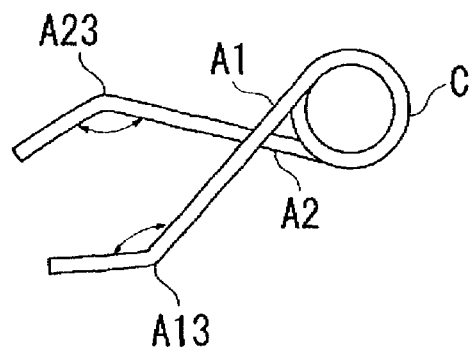
Figure 10C:
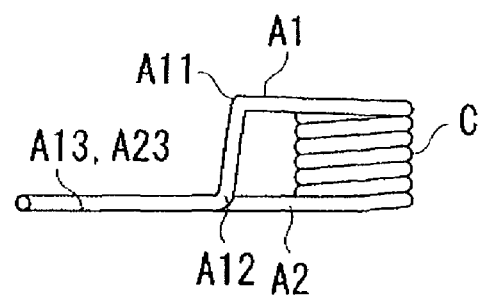

Next, the structure of the torsion spring 80a or 80b will be described with reference to FIGS. 10A through 10C. The torsion spring 80a or 80b has a coil portion C and two arm portions A1 and A2 extending from both sides of the coil portion C. The two arm portions A1 and A2 are at an angle of approximately 300 degrees, and cross each other in the direction in which the coil portion C extends (lens optical axis direction).

One arm portion A1 has greatly bent portions A11 and A12 and a slightly bent portion A13. The other arm portion A2 has a slightly bent portion A23.

The greatly bent portions A11 and A12 serve to make the positions in the lens optical axis direction of the two arm portions A1 and A2 the same. Due to the formation of the two arm portions A1 and A2, the positions where the arm portion A1 is engaged with the spring engagement portion 32a or 32b of the inner barrier blade 30a or 30b are close to the inner barrier blade 30a or 30b. As a result, it is possible to drive the inner barrier blades 30a and 30b with a force as small as possible.

The slightly bent portions A13 and A23 are formed in the portions of the arm portions A1 and A2 close to the distal ends thereof, that is, on the distal end side of the above-mentioned crossing position, and are bent so as to approach the other arm portion A2 or A1 (i.e., so as to approach each other).

As illustrated in FIGS. 5A and 5B, the spring engagement portions 32a and 32b of the inner barrier blades 30a and 30b are situated closer to the coil portion C of the torsion springs 80a and 80b than the spring engagement portions 52a and 52b of the drive cam spring 50, respectively. Thus, in the portions nearer to the coil portion C than the bent portions A13 and A23, the spring engagement portions 32a and 32b of the inner barrier blades 30a and 30b are engaged, and, on the distal end sides of the bent portions A13 and A23, the spring engagement portions 52a and 52 of the drive cam rig 50 are engaged.

The structure formed by the regulating portions 46a and 46b of the barrier base 40 and the outer barrier blades 20a and 20b of the present exemplary embodiment proves more effective in the drive structure using the torsion springs 80a and 80b described above.

Figure 11:
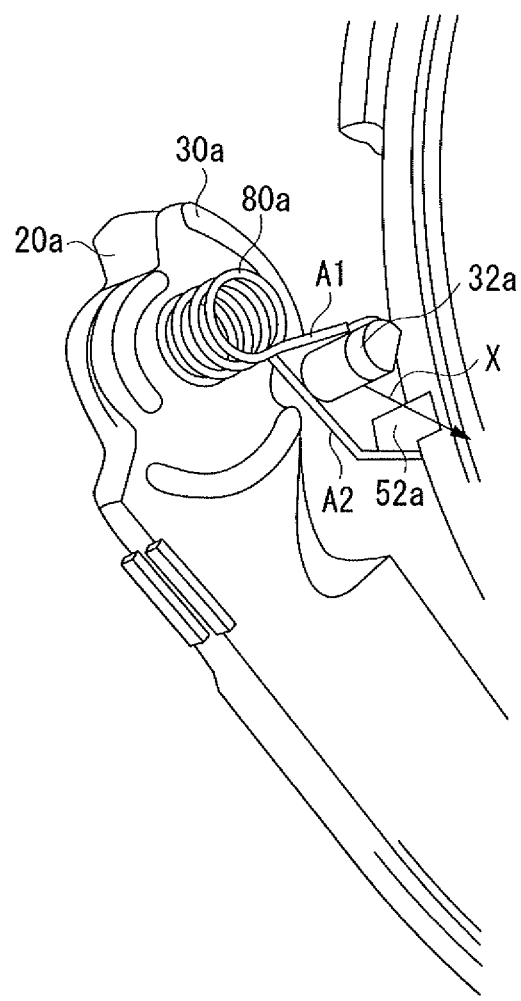
FIG. 11 is a diagram illustrating operation of the torsion spring.
Figure 12:
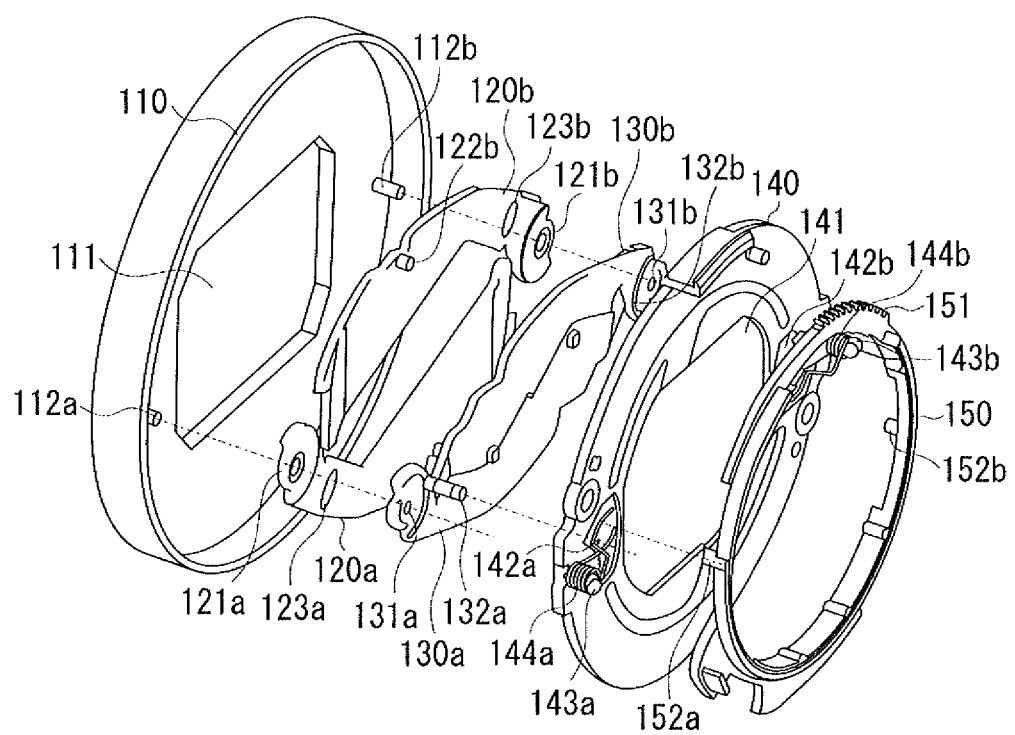
FIG. 12 is an exploded perspective view of a conventional lens barrier device.
Figure 13:
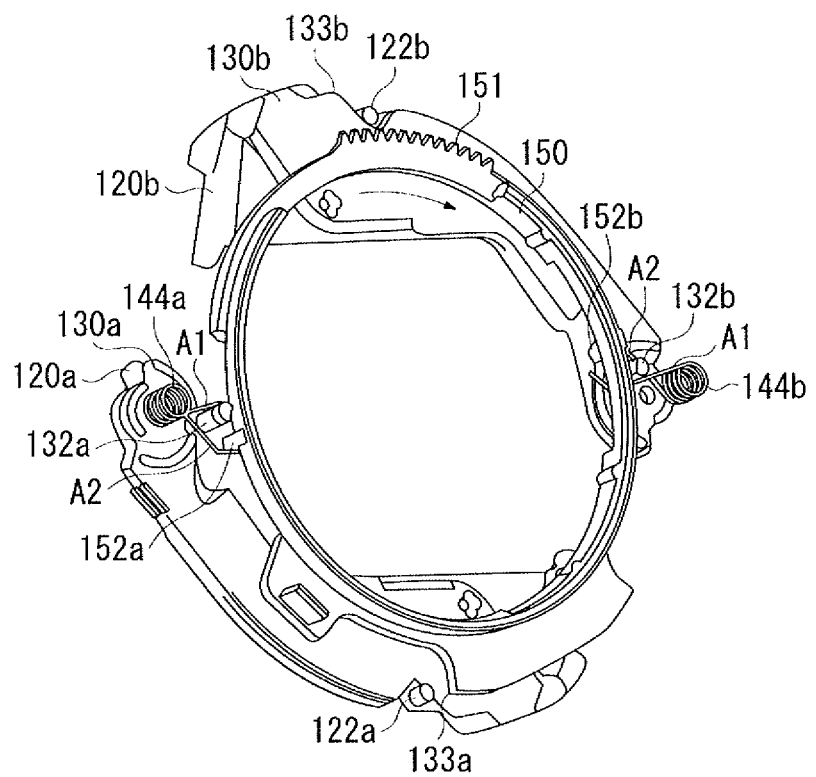
FIG. 13 is an assembly diagram illustrating conventional barrier blades.

FIG. 11 is an enlarged view of the portion where the torsion spring 80a or 80b and the inner barrier blade 30a or 30b contact each other. As is apparent from FIGS. 10A through 10C and FIG. 11, the arm portions A1 and A2 of the torsion spring 80a or 80b of the present exemplary embodiment are arranged so as to cross the spring engagement portion 32a or 32b of the inner barrier blade 30a or 30b. As a result, due to the restoring force of the coil spring, the arm portions A1 and A2 are urged in the closing direction, and the spring engagement portion 32a or 32b of the inner barrier blade 30a or 30b is constantly urged in the direction of the arrow X (which is also illustrated in FIG. 9) in FIG. 11. Thus, as illustrated in FIG. 9, there is generated in the inner barrier blades 30a and 30b a rotational moment in the direction indicated by the arrow Y around a point Z where the shaft hole 31a or 31b and the blade shaft 41a or 41b of the barrier base 40 are fit-engaged with each other. This rotational moment causes the inner barrier blades 30a and 30b to rotate due to fit-engagement play of the fit-engagement portion, and the third guide portions 35a and 35b constituting the outer peripheral ends rise on the optical axis forward end side. Further, due to the rising of the inner barrier blades 30a and 30b, the abutment portions 26a and 26b constituting the outer peripheral ends of the outer barrier blades 20a and 20b rise to the utmost degree.

Thus, by regulating the abutment portions 26a and 26b constituting the outer peripheral ends of the outer barrier blades 20a and 20b, which rise to the utmost degree, by the regulating portions 46a and 46b of the barrier base 40, it is possible to suitably suppress the rising due to the urging by the torsion springs 80a and 80b.

In particular, since the above-mentioned regulating portions also have a guide function, it is also possible to realize a suitable opening/closing operation. If the portions where the rising generated due to the urging by the torsion springs 80a and 80b is maximum were not regulated, an unintended portion would be allowed to be brought into contact, resulting in a fear of a suitable opening/closing operation being hindered.

The above exemplary embodiment of the present invention should not be construed restrictively. It is also possible to apply the present invention solely to one side of a lens barrier device having not four barrier blades but some other number of barrier blades, e.g., one barrier blade on one side and two on the opposite side.

Further, the drive structure may be of some other structure than the one described above. For example, instead of the torsion springs 80a and 80b, it is also possible to use ordinary coil springs utilizing tensile compression and to alter the structure of the drive cam ring 50.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-295438 filed Dec. 25, 2009, which is hereby incorporated by reference herein in its entirety.

What is claimed is:

1. A lens barrier device comprising:
a first barrier blade including a shielding portion, a connecting portion, and an abutment portion, wherein the abutment portion is connected to the shielding portion via the connecting portion, and wherein the abutment portion is arranged in an imaging surface side of the shielding portion of the first barrier blade;
a second barrier blade arranged in an imaging surface side of the first barrier blade; and
a regulating portion whose imaging surface side is arranged to be capable of contacting against the abutment portion,
wherein an outer peripheral portion of the second barrier blade, the connecting portion, and the abutment portion are arranged in this order in the direction from an optical axis of the lens to an outer side of the lens.

2. The lens barrier device according to claim 1, wherein the shielding portion, the connecting portion, and the abutment portion are formed integrally.

3. The lens barrier device according to claim 1, wherein the regulating portion is located to overlap a surface on an optical axis forward end side of the second barrier blade in an optical axis direction.

4. A lens barrel comprising:
the lens barrier device according to claim 1; and
a lens located on an optical axis rear end side of the lens barrier device.

* * * * *